United States Patent [19]

Liu

[11] Patent Number: 5,306,079
[45] Date of Patent: Apr. 26, 1994

[54] MULTI-PURPOSE FRAME FOR A COMPUTER

[75] Inventor: Morgan C. Liu, Taoyuan, Taiwan

[73] Assignee: Enlight Corporation, Taoyuan, Taiwan

[21] Appl. No.: 958,304

[22] Filed: Oct. 8, 1992

[51] Int. Cl.⁵ .............................................. H05K 7/14
[52] U.S. Cl. ................... 312/223.2; 361/685; 361/724
[58] Field of Search ................... 312/223.2, 257.1; 361/390, 391, 380, 427, 428, 429, 685; 364/708; 174/50.52, 65 R

[56] References Cited

U.S. PATENT DOCUMENTS

| | | | |
|---|---|---|---|
| 4,864,469 | 9/1989 | Boudon | 361/685 |
| 4,979,636 | 12/1990 | Daly | 361/390 X |
| 5,136,466 | 8/1992 | Remise et al. | 361/391 X |
| 5,136,468 | 8/1992 | Wong et al. | 361/391 X |
| 5,138,525 | 8/1992 | Rodriguez | 361/685 |
| 5,224,024 | 6/1993 | Tu et al. | 361/685 X |

Primary Examiner—Timothy V. Eley
Assistant Examiner—Khan V. Nguyen
Attorney, Agent, or Firm—Ladas & Parry

[57] ABSTRACT

A multi-purpose frame for a computer comprises floppy disk seats and hard disk seats. The front end of the frame is provided with side hooks, front hooks and a downward urging retainer. The side portion of the frame is provided with interface card hooks, and the rear lower portion thereof is provided with a pair of L-shaped strips. Each of the hard disk seats is provided with fastening hooks and a resilient retainer, and one of the floppy disk seats is provided with dovetail grooves having a recess located in therebetween. The frame facilitates the dismounting and replacing of the disk drives, and which may be mounted to or dismounted from the computer base conveniently.

17 Claims, 4 Drawing Sheets

MULTI-PURPOSE FRAME FOR A COMPUTER

BACKGROUND OF THE INVENTION

The present invention relates to a multi-purpose frame for a computer which is adapted to receive floppy and hard disk drives and facilitates the dismounting and replacing of the disk drives. Besides, the provision of hooks and apertures on the frame facilitates its assembling and disassembling within the computer housing.

In assembling computer components, it is normally effected by means of tiny screws. However, due to fast development in the computer field, the memory of the computer is greatly extended and there is a need to mount functional components on the computer whenever necessary. Conventional computers which make use of screws as fastening elements often cause inconvenience in the extension, maintenance, and replacing of the computer components because it is necessary to dismount the relevant components. Besides, the tiny screws may be lost during the procedure.

Similar problems also occur during the fixation of the disk drives (including floppy and hard disk drives). During the dismounting of the computer, except the housing, the frame is one of the components which has to be frequently dismounted during the maintenance, replacing and extension procedures.

SUMMARY OF THE INVENTION

The primary object of the present invention is to provide a multi-purpose frame for a computer which facilitates the quick replacing or dismounting of the floppy and hard disk drives.

A further object of the present invention is to provide a multi-purpose frame for a computer which may be quickly replaced or dismounted within the computer, so that the time taken in the assembling can be shortened and maintenance, replacing and extension of the computer components can be quickly effected whenever necessary.

A further object of the present invention is to provide a multi-purpose frame for a computer which may effect enhanced securing to the interface card so as to position the interface card securely in place.

Another object of the invention is to provide a multi-purpose frame for a computer which is positioned between the front and rear ends of the computer base, and is capable of sustaining the vertical load exerted on the computer, thereby enhancing the strength of the computer in sustaining load.

These and other objects, advantages and features of the present invention will be more fully understood and appreciated by reference to the written specification.

DETAILED DESCRIPTION OF THE INVENTION

Figure 1:
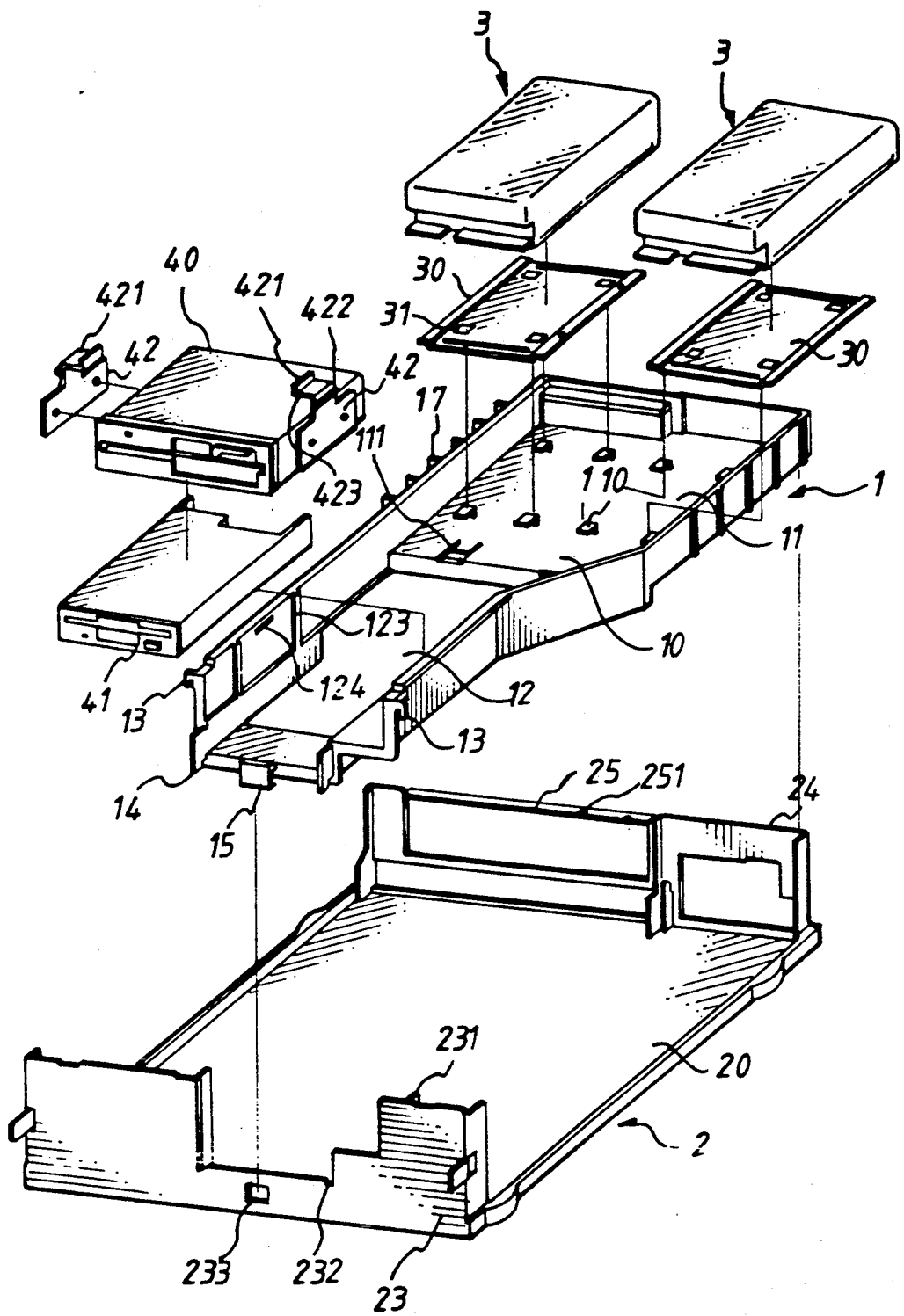
FIG. 1 is an exploded view of a multi-purpose frame in association with a plurality of fitting components.
Figure 2:
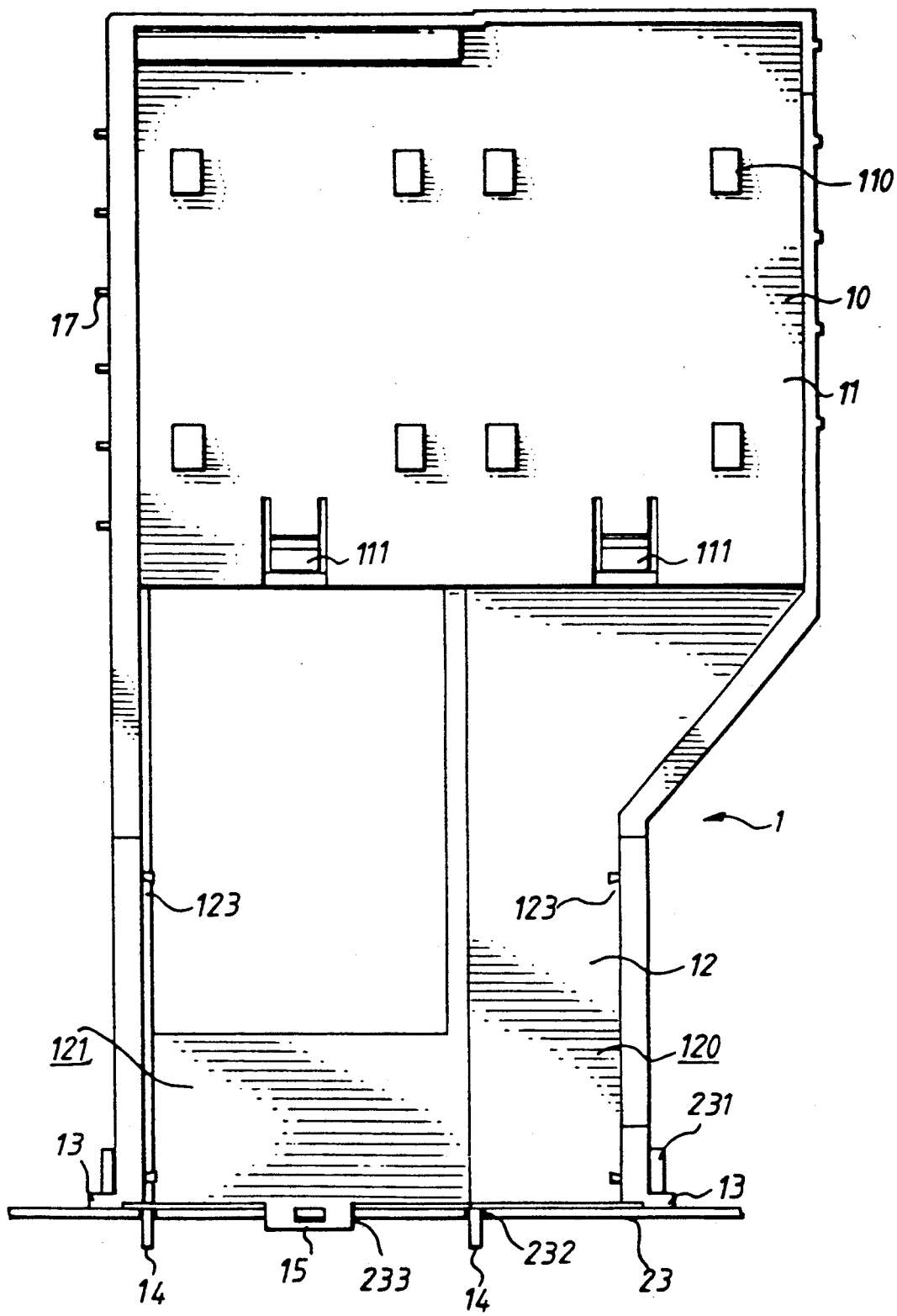
FIG. 2 is a plan view of the present invention in association with part of a computer base.

Referring now to FIGS. 1 and 2, a frame 1, in accordance with the present invention, is substantially formed of a rectangular box. The front end of the frame 1 has two floppy disk seats 12, with one of the seats arranged on top of the other, and the rear part of the frame 1 has two hard disk seats 11 located parallelly. A pair of side hooks 13 each having a channel at the end are provided on both sides of the front end, and extend outward. A pair of front hooks 14 each having a channel at the bottom end thereof are provided at the lower portion of the front end. The lower portion of the front end is further provided with a downward urging retainer 15 which projects downward and includes an inverted hook. A plurality of interface card hooks 17 disposed horizontally and equidistantly spaced from each other are provided on the left side of the main body 10.

There are two hard disk drives 3, a 5¼" floppy disk drive 40 and a 3½" floppy disk drive 41 which can be disposed on the frame 1, wherein the 3½" floppy disk drive 41 can be fixed by known means. There are two fastening means disposed side by side within the hard disk seat 11 of the frame 1. Each of the fastening means includes four projecting fastening hooks 110. Each of the fastening hooks 110 is substantially in the shape of an inverted "L". A resilient retainer having a hook, which is integral with the main body 10, is provided in front of the fastening means. A chassis 30 is attached to the bottom of the hard disk drive 3. Four openings 31 corresponding to the fastening hooks 110 are provided on the chassis 30. After the hard disk drive 3 and the chassis 30 are incorporated by known means, they are slidingly inserted into the hard disk seat 11 along a horizontal direction, such that the fastening hooks 110 fit in the openings 31, and the resilient retainer 111 hooks on the front edge. In this way, the hard disk drive 3 can be mounted on the hard disk seat 11 rapidly. During dismounting, the hard disk drive 3 incorporated with the chassis 30 can be readily removed from the hard disk seat 11 by simply pressing the resilient retainer 111.

In the floppy disk seats 12, a larger floppy disk seat 120 is disposed at the top and a smaller floppy disk seat 121 is disposed at the bottom. The larger floppy disk slot 120 is designed to receive the 5¼" floppy disk drive 40, while the smaller floppy disk seat 121 to receive the 3½" floppy disk drive 41. A pair of dovetail grooves 123 having a recess 124 located in therebetween are provided on both side walls of the larger floppy disk seat 120. A pair of dovetail plates 42 are attached to both sides of the 5¼" floppy disk drive 40. Each of the plates 42 includes a protruding resilient piece 423 having a rib 422 at the outer edge thereof. The plate 42 further folds inward to form a press-in piece 421. During mounting, the 5¼" floppy disk drive 40 is inserted into the dovetail grooves 123 via the dovetail plates 42, and the ribs 422 engage in the recesses 124, thereby accomplishing the fixation of the 5¼" floppy disk drive 40. During dismounting, one may use two fingers to press the press-in pieces 421 inward, such that the resilient pieces 423 disengage from the recesses 124 with the ribs 422. By such a manner, the 5¼" floppy disk drive 40 can be quickly and easily removed.

Figure 3:
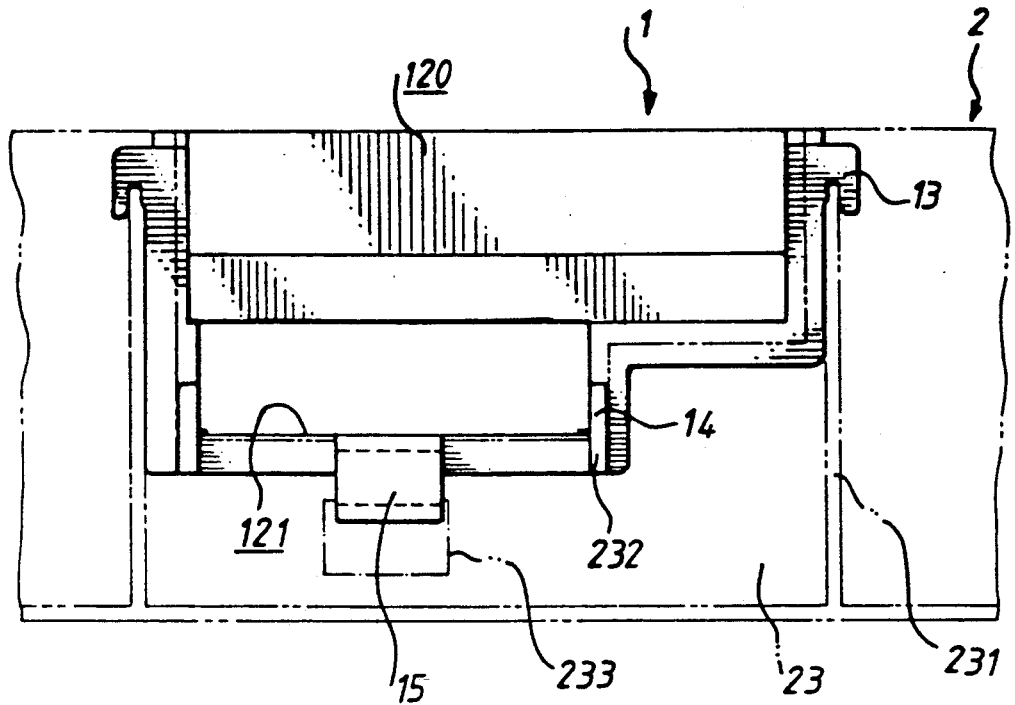
FIG. 3 is a front elevational view of the present invention in association with part of a computer base.
Figure 5:
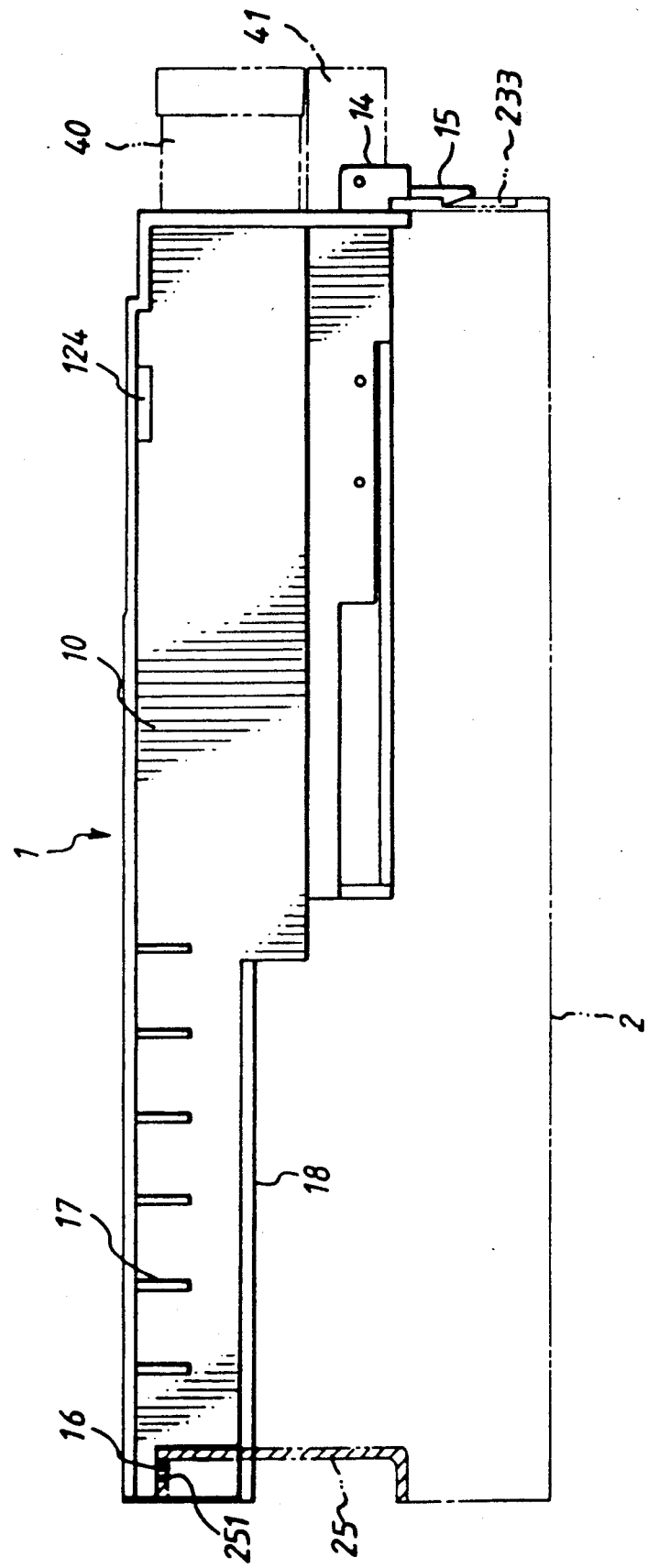
FIG. 5 is the side elevational view of the invention in association with the corresponding computer components.

As shown in FIG. 1, a computer base 2 comprises a front plate 23, a bottom plate 20, and a rear plate 24 in association with an interface seat 25, wherein the front plate 23, rear plate 24 and interface seat 25 all produce supporting or fastening effect to the frame 1. With reference to FIGS. 2 and 3, the side hooks 13 of the frame 1 are designed to hook into the side projecting strips 231 of the front plate 23, and the front hooks 14 designed to hook into the front slits 232. With reference to FIG. 5, as the urging retainer 15 slides downward, it may pass the recess 233 of the front plate 23 and urges against the edge thereof.

Figure 4:
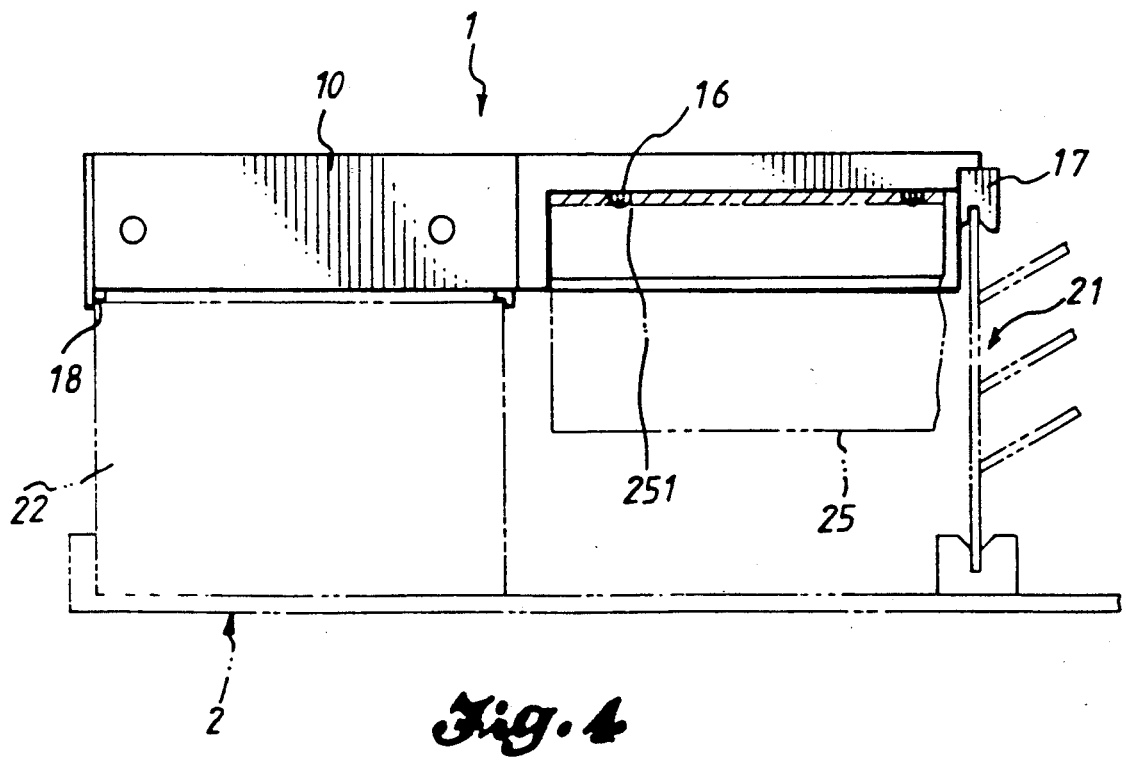
FIG. 4 is a rear elevational view of the invention in association with the corresponding computer components.

Supporting to the rear end of frame 1 is effected by a power supply 22, the rear plate 24 and interface seat 25. With reference to FIGS. 4 and 5, a pair of projections 16 each in the shape of a cross extends downward from the rear left portion of the main body 10. The bottom of the rear right portion of the main body 10 is provided with a pair of L-shaped strips 18. The L-shaped strips 18 are positioned right on top of the power supply 22. Since the L-shaped strips 18 are stepped in configuration, a clearance is formed between the main body 10 and power supply 22. Supporting the frame 1 is partially effected by the strong and rigid power supply 22. The interface seat 25 to which the rear plate 24 connects has two holes 251. As the projections 16 is engaged within the holes 251, some support as well as positioning is effected (also refer to FIG. 5).

In view of the preceding description, it is apparent that after the frame 1 is mounted with the hard disk drives 3, 5¼" floppy disk drive 40 and 3½" floppy disk drive 41, the assembly is placed vertically downward in alignment with the computer base 2. In further detail, the side hooks 13 cooperate with side projecting strips 231, the front hooks 14 cooperate with front slits 232, and the projections 16 cooperate with holes 251, to effect secure positioning. Besides, with the cooperation of L-shaped strips 18 and power supply 22, the positioning in the downward direction is achieved. The securing effect preventing the frame 1 from moving upwards is achieved by downward urging retainer 15 and recess 233. To remove the frame 1, it is only necessary to pull the retainer 15 aside to vertically remove the frame 1 upward.

As shown in FIG. 4, interface card hooks 17 is provided on the left side of the frame 1, so as to provide positioning of the upper edge of the interface card 21. Therefore, the interface card 21 can be supported and better securing effect is attainable.

It is apparent that although the invention has been described in connection with a preferred embodiment, those skilled in the art may make changes to certain features of the preferred embodiment without departing from the spirit and scope of the invention as defined in the appended claims.

What is claimed is:

1. A multi-purpose frame for a computer being substantially a rectangular box formed by two side walls, comprising a top floppy disk seat and a bottom floppy disk seat on a front part thereof, and at least one hard disk seat at a rear part thereof; said top floppy disk seat having two inner walls of said side walls each provided with a fitting means, said hard disk having a support plate seat being provided with a plurality of projecting fastening hooks disposed thereon and at least one resilient retainer at a front edge thereof; said front part of said frame having a pair of side hooks on two lateral sides of a front end thereof, a pair of projected outward front hooks at a lower portion of the front end thereof and a downward urging retainer at the lower portion located between the front hooks.

2. The multi-purpose frame as claimed in claim 1, wherein each of said fitting means comprises a pair of dovetail grooves having a recess located in therebetween.

3. The multi-purpose frame as claimed in claim 2, wherein said rear part of said frame is provided with at least one projection which projects downward at a rear end thereof and a pair of L-shaped strips supporting said hard disk seat at a bottom thereof.

4. The multi-purpose frame as claimed in claim 3 wherein the projection is formed of a body in the shape of a cross.

5. The multi-purpose frame as claimed in claim 1, further comprising a plurality of interface card hooks which are equidistantly spaced from each other and disposed on one of said side walls of said frame.

6. In a multi-purpose frame for a computer, the frame comprising a substantially rectangular box, a first floppy disk seat and a second floppy disk seat on a front portion of the box, and at least one hard disk seat at a rear portion of the box, the improvement wherein:
said first floppy disk seat has fitting means on each of two opposite side walls thereof;
said hard disk seat having a support plate with a plurality of projecting fastening hooks disposed thereon and at lest one resilient retainer at a front edge thereof; and;
said front portion of said box has a side hook positioned on each of opposite sides of a front end thereof as a pair of said side hooks, a pair of front hooks projected outward on a lower portion of said front end thereof and a downward urging retainer between said front hooks.

7. The multi-purpose frame as claimed in claim 6, wherein each of said fitting means comprises a pair of dovetail grooves and a recess between said grooves.

8. The multi-purpose frame as claimed in claim 6, wherein said box further comprises:
at least one projection that projects downward at a rear end of said rear portion and a pair of L-shaped strips at a bottom of said rear portion.

9. The multi-purpose frame as claimed in claim 8, wherein said box further comprises:
at least one projection that projects downward at a rear end of said rear portion and a pair of L-shaped strips at a bottom of said rear portion.

10. The multi-purpose frame as claimed in claim 8, wherein the projection is formed of a body in the shape of a cross.

11. The multi-purpose frame as claimed in claim 9, wherein said side walls of the projection is formed of a body in the shape of a cross.

12. The multi-purpose frame as claimed in claim 6, wherein said side walls of said box further comprises:
a plurality of interface card hooks equidistantly spaced from each other along one side of said box.

13. The multi-purpose frame as claimed in claim 7, wherein said side walls of said box further comprises:
a plurality of interface card hooks equidistantly spaced from each other along one side of said box.

14. The multi-purpose frame as claimed in claim 8, wherein said side walls of said box further comprises:

a plurality of interface card hooks equidistantly spaced from each other along one side of said box.

15. The multi-purpose frame as claimed in claim 9, wherein said side walls of said box further comprises:
a plurality of interface card hooks equidistantly spaced from each other along one side of said box.

16. The multi-purpose frame as claimed in claim 10, wherein said side walls of said box further comprises:
a plurality of interface card hooks equidistantly spaced from each other along one side of said box.

17. The multi-purpose frame as claimed in claim 11, wherein said side walls of said box further comprises:
a plurality of interface card hooks equidistantly spaced from each other along one side of said box.

* * * * *